United States Patent
Pfaendner et al.

(10) Patent No.: US 10,370,537 B2
(45) Date of Patent: Aug. 6, 2019

(54) USE OF OXYIMIDE-COMPRISING COPOLYMERS OR POLYMERS AS FLAME RETARDANTS, STABILISERS, RHEOLOGY MODIFIERS FOR PLASTIC MATERIALS, INITIATORS FOR POLYMERISATION- AND GRAFTING PROCESSES, CROSSLINKING- OR COUPLING AGENTS AND ALSO PLASTIC MOULDING COMPOUNDS COMPRISING SUCH COPOLYMERS OR POLYMERS

(71) Applicant: FRAUNHOFER-GESELLSCHAFT ZUR FÖRDERUNG DER ANGEWANDTEN FORSCHUNG E.V., München (DE)

(72) Inventors: Rudolf Pfaendner, Rimbach (DE); Markus Mazurowski, Ginsheim-Gustav (DE)

(73) Assignee: Fraunhofer-Gesellschaft zur förderung der angewandten Forschung e.V., München (DE)

( * ) Notice: Subject to any disclaimer, the term of this patent is extended or adjusted under 35 U.S.C. 154(b) by 175 days.

(21) Appl. No.: 15/311,674

(22) PCT Filed: Apr. 16, 2015

(86) PCT No.: PCT/EP2015/058311
§ 371 (c)(1),
(2) Date: Nov. 16, 2016

(87) PCT Pub. No.: WO2015/180888
PCT Pub. Date: Dec. 3, 2015

(65) Prior Publication Data
US 2017/0107375 A1      Apr. 20, 2017

(30) Foreign Application Priority Data
May 28, 2014 (DE) .......................... 10 2014 210 214

(51) Int. Cl.
C08L 79/04 (2006.01)
C09K 21/14 (2006.01)
C08F 8/32 (2006.01)

(52) U.S. Cl.
CPC ................ C08L 79/04 (2013.01); C08F 8/32 (2013.01); C09K 21/14 (2013.01); C08L 2201/02 (2013.01)

(58) Field of Classification Search
CPC ...... C08L 79/04; C08L 2201/02; C09K 21/14
USPC ....................................................... 524/548
See application file for complete search history.

(56) References Cited

U.S. PATENT DOCUMENTS

| | | |
|---|---|---|
| 2,682,522 A | 6/1954 | Coover et al. |
| 2,716,101 A | 8/1955 | Coover et al. |
| 2,891,915 A | 6/1959 | McCormack et al. |
| 3,326,852 A | 6/1967 | Thomas |
| 3,442,854 A | 5/1969 | Curtius et al. |
| 3,488,329 A | 1/1970 | Johnson |
| 3,578,641 A | 5/1971 | Johnson |
| 3,915,930 A | 10/1975 | Dotson, Jr. et al. |
| 3,919,363 A | 11/1975 | Ura et al. |
| 3,946,093 A | 3/1976 | Koto et al. |
| 4,160,739 A | 7/1979 | Stambaugh et al. |
| 4,218,332 A | 8/1980 | Schwab et al. |
| 4,328,174 A | 5/1982 | Schmidt et al. |
| 4,331,614 A | 5/1982 | Schmidt et al. |
| 4,374,971 A | 2/1983 | Schmidt et al. |
| 4,415,719 A | 11/1983 | Schmidt et al. |
| 5,216,113 A | 6/1993 | Schulz-Schlitte et al. |
| 5,334,692 A | 8/1994 | Hess et al. |
| 5,369,198 A | 11/1994 | Albrecht et al. |
| 6,288,210 B1 | 9/2001 | Shobha et al. |
| 6,291,630 B1 | 9/2001 | König et al. |
| 6,861,499 B2 | 3/2005 | Vinciguerra et al. |
| 7,115,765 B2 | 10/2006 | Sprenger et al. |
| 7,138,448 B2 * | 11/2006 | Kaprinidis .......... C08K 5/0066 524/101 |
| 7,390,970 B2 | 6/2008 | Lee et al. |
| 7,745,519 B2 | 6/2010 | Ihara et al. |
| 7,816,486 B2 | 10/2010 | Freitag et al. |
| 7,872,198 B2 | 1/2011 | Lee et al. |
| 8,058,329 B2 | 11/2011 | Just et al. |
| 8,288,456 B2 | 10/2012 | Feldermann et al. |
| 8,349,925 B2 | 1/2013 | Butz |

(Continued)

FOREIGN PATENT DOCUMENTS

| | | |
|---|---|---|
| CA | 819181 A | 7/1969 |
| CN | 102031101 A | 4/2011 |

(Continued)

OTHER PUBLICATIONS

Narita et al., Bulletin of the Chemical Society of Japan, vol. 44, 1084-1089, 1971. (Year: 1971).*
Korean Intellectual Property Office, Notification of Reason for Refusal in Korean Patent Application No. 10-2016-7033285 (dated Aug. 31, 2017).
State Intellectual Property Office of the People's Republic of China, First Office Action in Chinese Patent Application No. 201580028339.5 (dated Mar. 15, 2018).
Japan Patent Office, Notification of Reasons for Refusal in Japanese Patent Application No. 2016-569619 (dated Mar. 7, 2018).
(Continued)

*Primary Examiner* — Hui H Chin
(74) *Attorney, Agent, or Firm* — Leydig, Voit & Mayer, Ltd.

(57) ABSTRACT

The present invention relates to the use of oxyimide-comprising copolymers or polymers as flame retardants for plastic materials, stabilisers for plastic materials, rheology modifiers for plastic materials and also as initiators for polymerisation- and grafting processes and/or crosslinking- or coupling agents. In addition, the present invention relates to plastic material molding compounds which comprise such copolymers or polymers.

20 Claims, No Drawings

(56) References Cited

U.S. PATENT DOCUMENTS

| | | | |
|---|---|---|---|
| 8,853,307 | B2 | 10/2014 | Butz |
| 9,556,326 | B2 | 1/2017 | Menozzi et al. |
| 2005/0020800 | A1 | 1/2005 | Levchik et al. |
| 2005/0064177 | A1 | 3/2005 | Lee et al. |
| 2005/0176983 | A1 | 8/2005 | Sprenger et al. |
| 2007/0135538 | A1 | 6/2007 | Ihara et al. |
| 2007/0219295 | A1 | 9/2007 | Levchik et al. |
| 2008/0045673 | A1 | 2/2008 | Piotrowski et al. |
| 2008/0167405 | A1 | 7/2008 | Just et al. |
| 2008/0226918 | A1 | 9/2008 | Lee et al. |
| 2009/0118394 | A1 | 5/2009 | Feldermann et al. |
| 2009/0286060 | A1 | 11/2009 | Sala et al. |
| 2010/0230158 | A1 | 9/2010 | Hase et al. |
| 2010/0280215 | A1 | 11/2010 | Just et al. |
| 2011/0027512 | A1 | 2/2011 | Lee et al. |
| 2011/0256457 | A1 | 10/2011 | Utsumi |
| 2011/0257310 | A1 | 10/2011 | Butz |
| 2013/0023609 | A1 | 1/2013 | Menozzi et al. |
| 2013/0203928 | A1 | 8/2013 | Hocke et al. |
| 2013/0216752 | A1* | 8/2013 | Menozzi ............... C08F 8/30 428/36.9 |
| 2014/0005289 | A1 | 1/2014 | Butz |
| 2016/0052927 | A1 | 2/2016 | Pfaendner et al. |
| 2016/0272789 | A1 | 9/2016 | Pfaendner et al. |

FOREIGN PATENT DOCUMENTS

| | | |
|---|---|---|
| CN | 102115530 A | 7/2011 |
| CN | 102115558 A | 7/2011 |
| CN | 102250400 A | 11/2011 |
| CN | 102342869 A | 2/2012 |
| CN | 102344598 A | 2/2012 |
| CN | 102382453 A | 3/2012 |
| CN | 102585429 A | 7/2012 |
| CN | 103168053 A | 6/2013 |
| DE | 268 249 A1 | 5/1989 |
| DE | 100 22 946 A1 | 11/2001 |
| DE | 600 07 914 T2 | 12/2004 |
| DE | 102004010455 A1 | 9/2005 |
| DE | 102007040927 A1 | 3/2009 |
| DE | 112008003070 T5 | 9/2010 |
| DE | 102009047030 A1 | 2/2011 |
| DE | 102013005307 A1 | 9/2014 |
| EP | 0 303 988 A2 | 2/1989 |
| EP | 0 767 182 A2 | 4/1997 |
| EP | 0 935 619 B1 | 6/2001 |
| EP | 2 426 163 A1 | 3/2012 |
| EP | 2 450 401 A1 | 5/2012 |
| JP | H10-213912 A | 8/1998 |
| JP | 2007-016162 A | 1/2007 |
| JP | 2007-016163 A | 1/2007 |
| JP | 2013-540191 A | 10/2013 |
| WO | WO 97/47566 A1 | 12/1997 |
| WO | WO 1999/000450 A1 | 1/1999 |
| WO | WO 2002/074847 A1 | 9/2002 |
| WO | WO 2003/016388 A1 | 2/2003 |
| WO | WO 2003/070736 A1 | 8/2003 |
| WO | WO 2006/084488 A1 | 8/2006 |
| WO | WO 2006/084489 A1 | 8/2006 |
| WO | WO 2008/101845 A1 | 8/2008 |
| WO | WO 2009/080554 A1 | 7/2009 |
| WO | WO 2010/026230 A1 | 3/2010 |
| WO | WO 2010/135398 A1 | 11/2010 |
| WO | WO 2011/000019 A1 | 1/2011 |
| WO | WO 2011/003773 A1 | 1/2011 |
| WO | WO 2011/086114 A1 | 7/2011 |
| WO | WO 2011/117266 A1 | 9/2011 |
| WO | WO 2011/156077 A1 | 12/2011 |
| WO | WO 2012/052376 A1 | 4/2012 |
| WO | WO 2012/089998 A2 | 7/2012 |
| WO | WO 2013/020696 A2 | 2/2013 |
| WO | WO 2013/068437 A2 | 5/2013 |
| WO | WO 2013/072295 A1 | 5/2013 |
| WO | WO 2014/076273 A1 | 5/2014 |
| WO | WO 2014/154636 A1 | 10/2014 |
| WO | WO 2014/195440 A1 | 12/2014 |
| WO | WO 2015/180888 A1 | 12/2015 |
| WO | WO 2015/189034 A1 | 12/2015 |

OTHER PUBLICATIONS

Aubert et al., "Azoalkanes—novel flame retardants and their structure—property relationship," *Polym. Adv. Technol.* 22(11): 1529-1538 (2011).

Carpino et al.. "The uronium/guanidinium peptide coupling reagents: Finally the true uronium salts," *Angewandte Chemie-International Edition 41*: 442-445 (2002).

Dintcheva et al., "Photo-oxidation behaviour of polyethylene/multi-wall carbon nanotube composite films," *Polymer Degradation and Stability*, vol. 94, No. 2, pp. 162-170 (2008).

Imajo et al., "Polyimides derived from bis-N-hydroxyimides. II. Synthesis and properties of polyimide-esters," *Journal of Polymer Science Part A: Polymer Chemistry*, vol. 18(7), pp. 2189-2196 (1980).

Imajo et al., "Polymides derived from bis-N-hydroxyimides. III. Polymide-carbonates and polymide-urethanes synthesized from bischlorformate of N,N'-dihydroxypyromellitic diimide," *Journal of Polymer Science Part A: Polymer Chemistry*, vol. 19(7), pp. 1855-1861 (1981).

Katsenis et al., "Initial use of 1-hydroxybenzotriazole in the chemistry of group 12 metals: An 1D zinc(II) coordination polymer and a mononuclear cadmium(II) complex containing the deprotonated ligand in a novel monodentate ligation mode," *Inorg. Chem. Comm.* 12(2): 92-96 (2009).

Pawelec et al., "Triazene compounds as a novel and effective class of flame retardants for polypropylene," *Polym. Degrad. Stab.* 87(6): 48-954 (2012).

Pfaendner, "Nitroxyl radicals and nitroxylethers beyond stabilization: radical generators for efficient polymer modification," *Comptes Rendus Chimie* 9(11):1338-1344 (2006).

*Plastics Additives Handbook*, 5th edition, Chapter I—"Antioxidants," H. Zweifel, editor, Munich, pp. 1-139 (2001).

Shi et al., "Influence of wall number and surface functionalization of carbon nanotubes on their antioxidant behavior in high density polyethylene," *Carbon*, 50(3):1005-1013 (2012).

Spatz et al. "Some N-Substituted Tetrabromophthalimide Fire-Retardant Additives", *Industrial & Engineering Chemistry Product Research and Development*, vol. 8, pp. 397-398 (1969).

Spitalsky et al., "Carbon nanotube-polymer composites: Chemistry, processing, mechanical and electrical properties," *Progr. Pol. Sci.* 35:357-401 (2010).

Watts et al., "Carbon nanotubes as polymer antioxidants," *J. Mater. Chem.*, 3(13): 491-495 (2003).

Wilén et al., "Improving weathering resistance of flame-retarded polymers," *Journal of Applied Polymer Science* 129(3):925-944 (2013).

Zeynalov et al., "Antioxidative Activity of Carbon Nanotube and Nanofiber," *The Open Materials Science Journal*, vol. 2, pp. 28-34 (2008).

European Patent Office, International Search Report in International Application No. PCT/EP2015/058311 (dated Jul. 2, 2015).

European Patent Office, Written Opinion in International Application No. PCT/EP2015/058311 (dated Jul. 2, 2015).

International Bureau of WIPO, International Preliminary Report on Patentability in International Application No. PCT/EP2015/058311 (dated Nov. 29, 2016).

Korean Intellectual Property Office, Notification of Reason for Refusal in Korean Patent Application No. 10-2016-7033285 (dated Mar. 28, 2018).

Aubert et al., "Azoalkanes: A Novel Class of Additives for Cross-Linking and Controlled Degradation of Polyolefins," *Macromol. Mater. Eng.* 292(16): 707-714 (2007).

Bacsa et al., "Solid-Phase Synthesis of Difficult Peptide Sequences at Elevated Temperatures: A Critical Comparison of Microwave and Conventional Heating Technologies," *J. Org. Chem.* 73(19): 7532-7542 (2008).

(56) References Cited

OTHER PUBLICATIONS

Laufer et al., "A reagent for peptide synthesis. Copoly(ethylene-N-hydroxymaleimide)," *JACS 90*: 2696-2698 (1968).
Pospišil et al., "Physically persistent stabilizers by functionalization of polymers," *Macromol. Symp. 164*(1): 389-399 (2001).
European Patent Office, Notification under Article 94 (3) EPC in European Patent Application No. 15 717 162.0 (dated Nov. 17, 2017).
State Intellectual Property Office of the People's Republic of China, Second Office Action in Chinese Patent Application No. 201580028339.5 (dated Oct. 15, 2018).
National Intellectual Property Adminstration of the People's Republic of China, Third Office Action in Chinese Patent Application No. 201580028339.5 (dated Apr. 1, 2019).

* cited by examiner

USE OF OXYIMIDE-COMPRISING COPOLYMERS OR POLYMERS AS FLAME RETARDANTS, STABILISERS, RHEOLOGY MODIFIERS FOR PLASTIC MATERIALS, INITIATORS FOR POLYMERISATION- AND GRAFTING PROCESSES, CROSSLINKING- OR COUPLING AGENTS AND ALSO PLASTIC MOULDING COMPOUNDS COMPRISING SUCH COPOLYMERS OR POLYMERS

CROSS-REFERENCE TO RELATED APPLICATIONS

This patent application is the U.S. national phase of International Application No. PCT/EP2015/058311, filed on Apr. 16, 2015, which claims the benefit of German Patent Application No. 10 2014 210 214.6, filed May 28, 2014, the disclosures of which are incorporated herein by reference in their entireties for all purposes.

The present invention relates to the use of oxyimide-comprising copolymers or polymers as flame retardants for plastic materials, stabilisers for plastic materials, rheology modifiers for plastic materials and also as initiators for polymerisation- and grafting processes and/or crosslinking- or coupling agents. In addition, the present invention relates to plastic material moulding compounds which comprise such copolymers or polymers.

Additives are essential formulation components in plastic materials in order to enable e.g. processing and long-lasting use, and also in order to change the plastic material properties and to adapt them to a required property profile. Typical representatives of plastic material additives are stabilisers, such as antioxidants and light-protection means, plasticisers, lubricants, antistatic agents, impact modifiers, nucleation agents and flame retardants. Many commercial products of the mentioned substance classes are however low-molecular compounds which hence are comparatively volatile or, under the corresponding conditions, can migrate easily out of the plastic material and pass into the environment. At the same time, the plastic material loses the thus introduced properties with the loss of the additives.

Underlying the effect of specific additives, such as stabilisers and flame retardants, is generally a mechanism, the essential element of which is the formation of radicals. For example, the phenolic antioxidants frequently used as stabilisers transfer, in the first reaction step, a hydrogen atom to a polymer radical produced in the degradation processes of the plastic material, simultaneously form a stable phenoxyl radical and hence interrupt the auto-oxidative process (see e.g. Plastic Additives Handbook (editor H. Zweifel, Hanser Press, Munich, 5th edition, 2001). Radical generators which, in the case of fire, exert a flame-retardant effect due to a hence induced very rapid degradation process represent a particular class of flame retardants (see e.g. C. E. Wilen, R. Pfaendner, J. Appl. Pol. Sci. 2013, 129, 925). The mentioned radical formers also frequently concern low-molecular substances, the effect of which can decrease then with time due to the already mentioned volatility or migration. Furthermore, in particular if higher concentrations are required, low-molecular additives can negatively influence typical plastic material properties, such as mechanical, electrical and rheological properties. There is therefore a requirement for high-molecular, i.e. polymeric radical formers which offer the desired properties, e.g. the function as stabiliser or flame retardant, but do not have the mentioned disadvantages and which are available, in addition, by means of comparatively simple synthetic processes.

Basically, copolymers with maleic anhydride-similar structural elements are known and known, for example, as photoresists (JP 10213912), optical film (JP 2007016163), thickener in oil production (CN 102031101) and as matrix material for peptide synthesis (U.S. Pat. No. 3,488,329, U.S. Pat. No. 3,578,641). In the field of stabilisers, there are examples of polymeric compounds, the production principles of which are described, for example, in J. Pospisil et al., Macromol. Symp. 2001, 164, 389. The production of radical-forming stabilisers or ones reacting with radicals is however difficult since these are involved in normal polymerisation processes, such as e.g. in a radical polymerisation. A suitable production method for polymeric stabilisers is therefore polymer-analogous conversion. This is described e.g. in EP 0935619, in addition to a stabilising effect, also a compatiblising effect being exerted there and the products therefore being particularly suitable for polymer blends. One example of a polymeric flame retardant is ammonium polyphosphate, this however concerning a non-meltable inorganic compound. Polymeric flame retardants which are furthermore halogen-free are to date scarcely known.

It was therefore the object of the present invention to make available radical formers based on a polymer, which can be used in plastic materials as stabilisers, flame retardants, rheology modifiers, initiators for polymerisation- and grafting processes, crosslinking- or coupling agents.

This object is achieved, with respect to use of a copolymer or polymer as flame retardant for plastic materials, stabilisers for plastic materials, rheology modifiers for plastic materials, initiators for polymerisation- and grafting processes and/or crosslinking- or coupling agents, according to the features described herein and, with respect to a plastic material moulding compound, by the features described herein. Also disclosed are advantageous developments of the invention.

According to the invention, the use of a copolymer or polymer as flame retardant for plastic materials, stabiliser for plastic materials, rheology modifier for plastic materials, initiator for polymerisation- and grafting processes and/or crosslinking- or coupling agents is hence indicated. The copolymer or polymer used according to the invention comprises at least one of the subsequently illustrated structural elements, a)

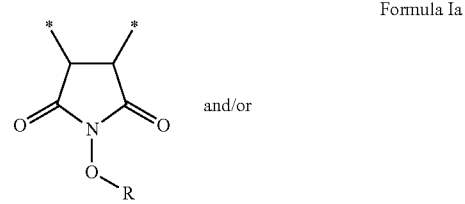

Formula Ia and/or

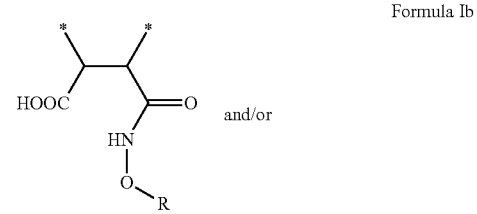

Formula Ib and/or b)

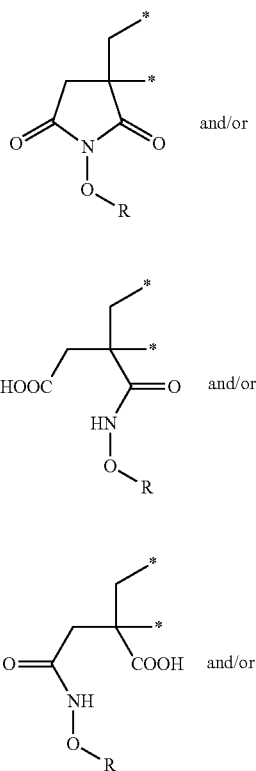

c)

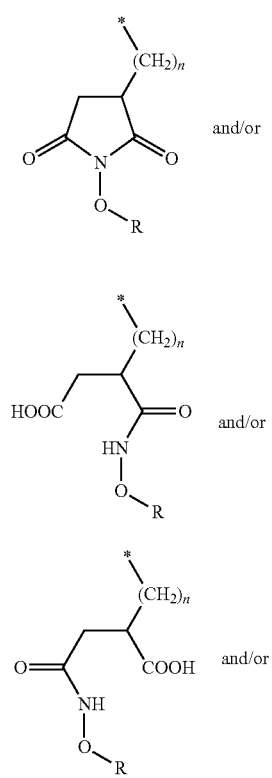

Formula IIa

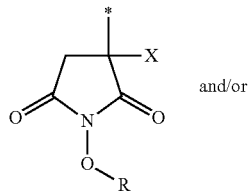

and/or

Formula IIb

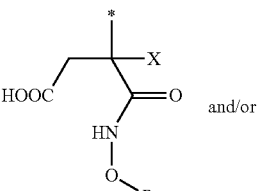

and/or

Formula IIc

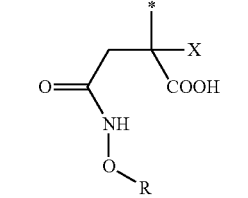

Formula IIIa (CH$_2$)$_n$ ... and/or

Formula IIIb (CH$_2$)$_n$ ... and/or

Formula IIIc (CH$_2$)$_n$ ... and/or

Formula IIId and/or

Formula IIIe and/or

Formula IIIf wherein the following mean, respectively independently of each other,
R a possibly substituted alkyl radical with 1 to 18 carbon atoms, a possibly substituted cycloalkyl radical with 6 to 22 carbon atoms, a possibly substituted aryl radical with 6 to 36 carbon atoms, a possibly substituted acyl radical with 2 to 18 carbon atoms or hydrogen,
* a binding site to the polymer,
n 0 or 1, and
X methyl.

It has been recognised that the polymers used according to the invention are very effective for equipping plastic materials with a flame-retardant effect, in order to stabilise plastic materials, in order to modify the rheological properties of plastic materials and/or in order to initiate polymerisation- and grafting processes. Because of their polymeric structure, the polymers used according to the invention, relative to low-molecular plastic material additives used nowadays in these application fields, have advantageous properties, such as e.g. low migration behaviour, low or no toxicity and high long-term stability.

The copolymers or polymers used according to the invention comprise at least one structural element of groups a), b) or c).

The structural elements of group a) concern oxyimides based on maleic anhydride (formula Ia) or oxyamides based on maleic acid (formula Ib), these structural elements being part of the main chain of the copolymer or polymer.

The structural elements of group b) concern oxyimides based on itaconic anhydride (formula IIa) or oxyamides based on itaconic acid (formula IIb), theses structural elements being part of the main chain of the copolymer or polymer.

The structural elements of group c) concern finally oxyimides based on maleic anhydride or itaconic anhydride or oxyamides based on maleic acid or itaconic acid, these structural elements not being part of the main chain of the copolymer or polymer but being grafted to the main chain of the copolymer or polymer. The copolymer or polymer produced in this way concerns therefore a graft copolymer or graft polymer. The structural elements according to formula IIId and also in the case n=1 and also the structural elements according to formula IIIa concern oxyimides based on itaconic anhydride. In the case n=0, the structural elements according to formula IIIa concern oxyimides based on maleic anhydride. The structural elements according to formulae IIIe and IIIf and also in the case n=1 and also the structural elements according to formulae IIIb and IIIc concern oxyamides based on itaconic acid. In the case n=0, the structural elements according to formulae IIIb and IIIc concern oxyamides based on maleic acid.

The structural elements of groups a), b) and c) can be present as oxyimides in ring form (formula Ia, IIa, IIIa and IIId) and/or as oxyamides in open-chain form (formula Ib, IIb, IIc, IIIb, IIIc, IIIe and IIIf). The ring form and the open-chain form are thereby formally in equilibrium with each other, the open-chain form converting into the ring form by means of a condensation reaction and the ring form being able to react formally by means of a hydrolysis reaction to form the open-chain form. Generally, this equilibrium is almost completely on the side of the oxyimide or of the ring form. The oxyimide or the ring form has therefore a significantly higher thermodynamic stability than the oxyamide or the open-chain form.

The polymers or copolymers, which comprise structural elements a) and/or b), can concern oxyimides or oxyamides derived from homopolymers of maleic anhydride or itaconic anhydride. Preferably, these polymers represent however copolymers in which at least one radically polymerisable monomer was copolymerised with maleic anhydride and/or itaconic anhydride and subsequently was converted into the corresponding oxyimide.

According to a preferred embodiment of the present invention, a) the copolymers or polymers according to feature a) are obtainable by conversion of copolymers or polymers comprising maleic anhydride b) the copolymers or polymers according to feature b) are obtainable by conversion of copolymers or polymers comprising itaconic anhydride c) the copolymers or polymers according to feature c), in the case of n=0, are obtainable by conversion of polymers or copolymers grafted with maleic anhydride, in the case of n=1 by conversion of polymers or copolymers grafted with itaconic anhydride with an amine compound according to the general formula IV

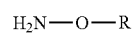

Formula IV

R being defined as previously. This amine compound is thereby used, with respect to the maleic anhydride- or itaconic anhydride functionalities, in particular in stoichiometric excess, so that it is ensured that as large a proportion as possible of the contained maleic anhydride- or itaconic anhydride functionalities is converted.

Furthermore it is preferred that the polymer used according to the invention is the product of conversion of a copolymer made of ethylene and maleic anhydride according to the general formula V

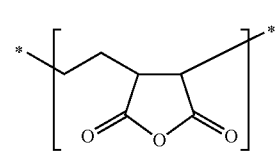

Formula V with an amine compound according to the general formula IV. Such a conversion is described e.g. in J. Am. Chem. Soc. 1968, 90, 2696-2698. Alternative copolymers made of ethylene and maleic anhydride according to general formula V are commercially available, their production being described for example in DD 268 249 A 1 and CA 819181. A commercial product is marketed for example by the company Vertellus with the title ZeMac (RTD). Graft copolymers of maleic anhydride based on polyethylene or polypropylene are obtainable for example with the title Scona from BYK-Chemie, with the title Exxelor VA from ExxonMobil or with the title Polybond from the company Addivant. Polystyrene-ethylene/butylene-graft-maleic anhydride-polystyrene block copolymers are marketed with the title Kraton by Kraton Polymers.

A further preferred embodiment provides that a) the maleic anhydride copolymers are selected from the group consisting of polymaleic anhydride-co-alkylenes, in particular polymaleic anhydride-co-ethylene, polymaleic anhydride-co-propylene, polymaleic anhydride-co-butylene, polymaleic anhydride-co-hexene, polymaleic anhydride-co-octene, polymaleic anhydride-co-octadecene, polymaleic anhydride-co-butadiene, polymaleic anhydride-co-vinylacetate, polymaleic anhydride-co-styrene, polymaleic anhydride co-vinylmethylether, polymaleic anhydride-co-vinylchloride, polymaleic anhydride-co-methyl(meth)acrylate, polymaleic anhydride-co-vinylalkylether, in particular polymaleic anhydride-co-vinylethylether, polymaleic anhydride-co-vinylbutylether, polymaleic anhydride-co-vinylpyrrolidone, polymaleic anhydride-co-acrylonitrile, and also corresponding terpolymers and blends or mixtures of the previously mentioned copolymers, b) the itaconic anhydride copolymers are selected from the group consisting of polyitaconic anhydride-co-alkylene, in particular polyitaconic anhydride-co-ethylene, polyitaconic anhydride-co-propylene, polyitaconic anhydride-co-butylene, polyitaconic anhydride-co-hexene, polyitaconic anhydride-co-octene, polyitaconic anhydride-co-octadecene, polyitaconic anhydride-co-butadiene, polyitaconic anhydride-co-vinylacetate, polyitaconic anhydride-co-styrene, polyitaconic anhydride-co-vinylmethylether, polyitaconic anhydride-co-vinylchloride, polyitaconic anhydride-co-methyl(meth)acrylate, polyitaconic anhydride-co-vinylalkylether, in particular polyitaconic anhydride-co-vinylethylether, polyitaconic anhydride-co-vinylbutylether, polyitaconic anhydride-co-vinylpyrrolidone, polyitaconic anhydride-co-acrylonitrile, and also corresponding terpolymers and blends or mixtures of the previously mentioned copolymers, c) the maleic anhydride-grafted polymers or copolymers are selected from the group consisting of polyethylene-graft-maleic anhydride, polypropylene-graft-maleic anhydride, polystyrene-graft-maleic anhydride, polystyrene-butadiene-graft-maleic anhydride-styrene, polystyrene-butylene/ethylene-graft-maleic anhydride-styrene, and/or the itaconic anhydride-grafted polymers or copolymers are selected from the group consisting of polyethylene-graft-itaconic anhydride, polypropylene-graft-itaconic anhydride, polystyrene-graft-itaconic anhydride, polystyrene-butadiene-graft-itaconic anhydride-styrene, polystyrene-butylene/ethylene-graft-itaconic anhydride-styrene and also blends or mixtures of the previously mentioned graft polymers.

Furthermore, it is preferred that
a) the total content of the structural elements Ia and Ib in the copolymer is of 0.1 to 99% by mol, preferably 20 to 80% by mol,
b) the total content of the structural elements IIa, IIb and IIc in the copolymer is of 0.1 to 99% by mol, preferably 20 to 80% by mol,
c) the total content of the structural elements IIIa, IIIb and IIIc in the graft copolymer or graft polymer is of 0.1 to 50% by weight, preferably of 0.5 to 10% by weight.

In a further preferred embodiment, the plastic material is selected from the group consisting of thermoplastic, elastomeric or duroplastic materials:
a) polymers made of olefins or dioefins, such as e.g. polyethylene (LDPE, LLDPE, VLDPE, ULDPE, MDPE, HDPE, UHMWPE), metallocene-PE (m-PE), polypropylene, polyisobutylene, poly-4-methylpentene-1, polybutadiene, polyisoprene, polycyclooctene, polyalkylene-carbon monoxide copolymers and also copolymers in the form of statistical or block structures, such as e.g. polypropylene-polyethylene (EP), EPM or EPDM, ethylene-vinylacetate (EVA), ethylene-acrylester, such as e.g. ethylene-butylacrylate, ethylene-acrylic acid and the salts thereof (ionomers), and also terpolymers, such as e.g. ethylene-acrylic acid-glycidylacrylate, graft polymers, such as e.g. polypropylene-g-maleic anhydride, polypropylene-g-acrylic acid, polyethylene-g-acrylic acid,
b) polystyrene, polymethylstyrene, polyvinylnaphthalene, styrene-butadiene (SB), styrene-butadiene-styrene (SBS), styrene-ethylene-butylene-styrene (SEBS), styrene-ethylene-propylene-styrene, styrene-isoprene, styrene-isoprene-styrene (SIS), styrene-butadiene-acrylonitrile (ABS), styrene-acrylonitrile-acrylate (ASA), styrene-ethylene, styrene-maleic anhydride polymers including corresponding graft copolymers, such as e.g. styrene on butadiene, maleic anhydride on SBS or SEBS, and also graft copolymers made of methylmethacrylate, styrene-butadiene and ABS (MABS),
c) halogen-containing polymers, such as e.g. polyvinylchloride (PVC), polychloroprene and polyvinylidene chloride (PVDC), copolymers made of vinylchloride and vinylidene chloride, or made of vinylchloride and vinylacetate, chlorinated polyethylene, polyvinylidene fluoride,
d) polymers of unsaturated esters, such as e.g. polyacrylates and polymethacrylates, such as polymethylmethacrylate (PMMA), polybutylacrylate, polylaurylacrylate, polystearylacrylate, polyacrylonitrile, polyacrylamides, copolymers, such as e.g. polyacrylonitrile-polyalkylacrylate,
e) polymers made of unsaturated alcohols and derivatives, such as e.g. polyvinyl alcohol, polyvinylacetate, polyvinylbutyral,
f) polyacetals, such as e.g. polyoxymethylene POM) or copolymers with e.g. butanal,
g) polyphenylene oxide and blends with polystyrene or polyamides,
h) polymers of cyclic ethers, such as e.g. polyethylene glycol, polypropylene glycol, polyethylene oxide, polypropylene oxide,
i) polyurethanes made of hydroxyterminated polyethers or polyesters and aromatic or aliphatic isocyanates, in particular linear polyurethanes, polyureas,
j) polyamides, such as e.g. polyamide-6, 6.6, 6.10, 4.6, 4.10, 6.12, 12.12, polyamide 11, polyamide 12 and also (partially) aromatic polyamides, such as e.g. polyphthalamides, e.g. produced from terephthalic acid and/or isophthalic acid and aliphatic diamines or from aliphatic dicarboxylic acids, such as e.g. adipic acid or sebacic acid and aromatic diamines, such as e.g. 1,4- or 1,3-diaminobenzene,
k) polyimides, polyamideimides, polyetherimides, polyesterimides, poly(ether)ketones, polysulphones, polyethersulphones, polyarylsulphones, polyphenylenesulphide, polybenzimidazoles, polyhydantoins,
l) polyesters made of aliphatic or aromatic dicarboxylic acids and diols or made of hydroxycarboxylic acids, such as e.g. polyethylene terephthalate (PET), polybutylene terephthalate (PBT), polypropylene terephthalate, polyethylene naphthylate, poly-1,4-dimethylolcyclohexane terephthalate, polyhydroxybenzoate, polyhydroxynaphthalate, polylactic acid,
m) polycarbonates, polyestercarbonates and also blends, such as e.g. PC/ABS, PC/PBT, PC/PET/PBT,
n) cellulose derivatives, such as e.g. cellulose nitrate, cellulose acetate, cellulose propionate, cellulose butyrate
o) and also mixtures, combinations or blends of two or more of the previously mentioned polymers.

Provided the polymers indicated under a) to o) concern copolymers, these can be present in the form of statistical ("random"), block- or "tapered" structures.

Provided the polymers indicated under a) to o) concern stereoregular polymers, these can be present in the form of isotactic, stereotactic but also atactic forms.

Furthermore, the polymers indicated under a) to o) can have both amorphous and (partially) crystalline morphologies.

Possibly, the polyolefins mentioned under a) can also be present crosslinked, e.g. crosslinked polyethylene which is then termed X-PE.

The polyolefins mentioned under a) can have any stereo structures, i.e. isotactic, syndiotactic or atactic or be present in stereo block structures.

Furthermore, the plastic material can also be selected from the group consisting of the following duromeric, non-thermoplastic plastic materials:
p) epoxy resins, consisting of di- or polyfunctional epoxy compounds in combination with e.g. aminic, anhydrous or catalytically acting hardeners,
q) phenol resins, such as e.g. phenol-formaldehyde resins, urea-formaldehyde resins, melamine-formaldehyde resins,
r) unsaturated polyester resins,
s) silicones,
t) polyurethanes as reaction products made of di- or polyfunctional isocyanates and polyols, polyureas,
u) alkyd resins, allyl resins.

In particular, the plastic material is selected from the group consisting of
a) polymers made of olefins or diolefins, such as e.g. polyethylene (LDPE, LLDPE, VLDPE, MDPE, HDPE), polypropylene, polyisobutylene, poly-4-methylpentene-1, polybutadiene, polyisoprene, polycyclooctene, and also copolymers in the form of statistical or block structures, such as e.g. polypropylene-polyethylene (EP), EPM or EPDM, ethylene-vinylacetate (EVA), ethylene-acrylester, b) polystyrene, polymethylstyrene, styrene-butadiene, styrene-butadiene-styrene (SBS), styrene-isoprene, styrene-butadiene-acrylonitrile (ABS), styrene-acrylonitrile-acrylate (ASA), styrene-maleic anhydride polymers including corresponding graft copolymers, such as e.g. styrene on butadiene or maleic anhydride on SBS, c) halogen-containing polymers, such as e.g. polyvinylchloride and polyvinylidene chloride, d) polymers of unsaturated esters, such as e.g. polyacrylates and polymethacrylates, such as PMMA, polyacrylonitrile, e) polymers made of unsaturated alcohols and derivatives, such as e.g. polyvinyl alcohol, polyvinylacetate, polyvinylbutyral, f) polyacetals, such as e.g. polyoxymethylene, g) polyphenylene oxides and blends with polystyrene, h) polyurethanes, in particular linear polyurethanes, i) polyamides, such as e.g. polyamide-6, 6.6, 6.10. 4.6, 4.10, 6.12, 12.12, polyamide 11, polyamide 12 and also (partially) aromatic polyamides, such as e.g. polyphthalamides, j) polyimides, polyamideimides, polyetherimides, polyketones, polysulphones, polyethersulphones, polyphenylene sulphide, k) polyesters, such as e.g. polyethylene terephthalate and polybutylene terephthalate, polylactic acid, l) polycarbonate, m) cellulose derivatives, such as e.g. cellulose nitrate, cellulose acetate, cellulose propionate, n) and also mixtures, combinations or blends of two or more of the previously mentioned polymers.

A further preferred variant of the invention provides that the copolymer or polymer is mixed in with the plastic material. The total content of the copolymer or polymer in the resulting mixture is thereby in particular 0.01 to 50% by weight, preferably 0.05 to 25% by weight.

The present invention relates in addition to a plastic material moulding compound, comprising at least one copolymer or polymer and also at least one plastic material. The copolymer or polymer thereby comprises at least one of the subsequently illustrated structural elements a)

Formula Ia

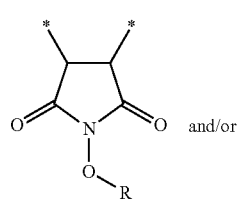

and/or

Formula Ib

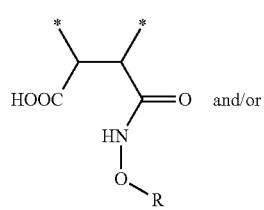

and/or b)

Formula IIa

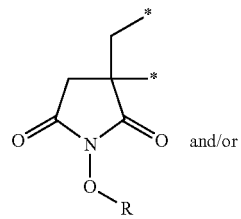

and/or

Formula IIb

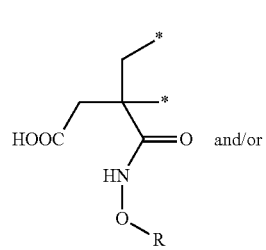

and/or

Formula IIc

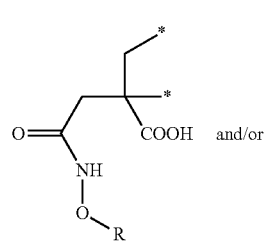

and/or c)

Formula IIIa

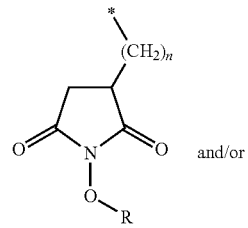

and/or

Formula IIIb

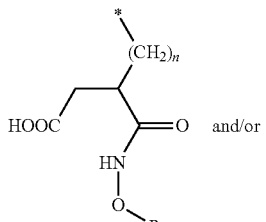

and/or

Formula IIIc

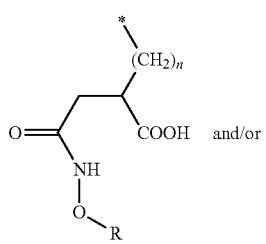

and/or

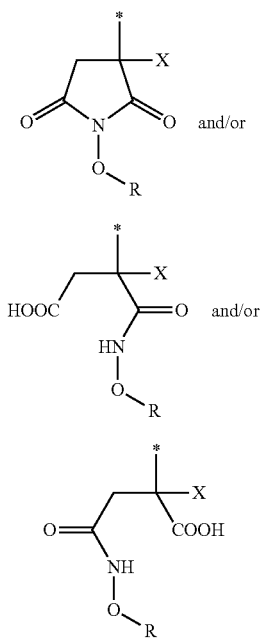

Formula IIId

Formula IIIe

Formula IIIf wherein, respectively independently of each other,

R means a possibly substituted alkyl radical with 1 to 18 carbon atoms, a possibly substituted cycloalkyl radical with 6 to 22 carbon atoms, a possibly substituted aryl radical with 6 to 36 carbon atoms, a possibly substituted acyl radical with 2 to 18 carbon atoms or hydrogen,

* a binding sight to the polymer, n 0 or 1

X methyl

In a preferred variant of the plastic material moulding compound according to the invention, the total content of the copolymer or polymer in the plastic material moulding compound is 0.01 to 50% by weight, preferably 0.05 to 25% by weight.

Furthermore, is it preferred that the plastic material moulding compound comprises, in addition to the at least one copolymer or polymer and the at least one plastic material, in addition up to 70 parts by weight, preferably up to 25 parts by weight, relative to the totality of the at least one copolymer or polymer and of the at least one plastic material, at least one flame retardant, selected from the group consisting of phosphorus-containing, nitrogen-containing, inorganic, silicon-containing, boron-containing, halogen-containing, sulphur-containing and/or radical-forming flame retardants.

The flame retardant is thereby preferably selected from the group consisting of a) inorganic flame retardants, such as e.g. Al(OH)$_3$, Mg(OH)$_2$, AlO(OH), layer silicates, such as e.g. montmorillonite, non- or organically modified, double salts, such as e.g. Mg—Al silicates, POSS compounds, b) nitrogen-containing flame retardants, such as e.g. melamine, melem, melam, melon, melamine derivatives, polyisocyanurates, melamine condensation products, allantoin, phosphacene, in particular melamine salts, benzoguanamine, melamine cyanurate, melamine phosphate, melamine pyrophosphate, dimelamine phosphate, melamine polyphosphate, ammonium polyphosphate, melamine borate, melamine hydrobromide, c) phosphorus-containing flame retardants, such as e.g. red phosphorus, phosphates, such as e.g. resorcin diphosphate, bisphenol-A-diphosphate and the oligomers thereof, triphenylphosphate, phosphinates, such as e.g. salts of hypophosphorous acid and derivatives thereof, such as diethylaluminium phosphinate or aluminium phosphinate, phosphonate ester, oligomeric and polymeric derivatives of methane phosphonic acid, 9,10-dihydro-9-oxa-10-phosphorylphenanthrene-10-oxide (DOPO) and substituted compounds thereof, d) halogen-containing flame retardants based on chlorine and bromine, such as e.g. polybrominated diphenyl oxides, tris(3-bromo-2,2-bis(bromomethyl)propylphosphate, ethylenebis(tetrabromophthalimide), tetrabromobisphenol A, brominated polystyrene, brominated polybutadiene, e) sulphur-containing flame retardants, such as e.g. elementary sulphur, disulphides and polysulphides, thiuram sulphide, dithiocarbamates, mercaptobenzothiazole and sulphenamides, f) borates, such as e.g. zinc borate or calcium borate, g) antidrip agents, such as e.g. polytetrafluorethylene, h) silicon-containing compounds, such as e.g. polyphenylsiloxanes, i) radical-forming substances, such as e.g. alkoxyamines, hydroxylamine esters, azo compounds, dicumyl or polycumyl.

Furthermore, it is preferred that the plastic material moulding compound according to the invention comprises additives which are selected from the group consisting of UV absorbers, light stabilisers, stabilisers, such as benzofuranones, metal deactivators, filler deactivators, fillers, reinforcing materials, nucleation agents, impact strength improvers, plasticisers, lubricants, rheology modifiers, processing aids, pigments, colourants, optical brighteners, antimicrobial active substances, antistatic agents, slipping means, antiblocking means, coupling means, dispersants, compatabilisers, oxygen collectors, acid collectors, marking means or anti-fogging means.

In a further preferred embodiment, the compositions comprise in particular acid interceptors, e.g. based on salts of long-chain acids, such as e.g. calcium stearate, magnesium stearate, zinc stearate, aluminium stearate, calcium lactate, calcium stearoyl-2-lactylates or of hydrotalcites.

Suitable light stabilisers are for example compounds based on 2-(2"-hydroxyphenyl)benzotriazolenes, 2-hydroxybenzophenonenes, esters of benzoic acids, acrylates, oxamides and 2-(2-hydroxyphenyl)-1,3,5-triazines.

Suitable 2-(2"-hydroxyphenyl)benzotriazoles are for example 2-(2'-hydroxy-5'methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2- ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-ylphenol]; the product of transesterification of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, R being=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole, 2-[2'-hydroxy-3'-(1,1,3,3-tetramethylbutyl)-5'-(α,α-dimethylbenzyl)phenyl]benzotriazole.

Suitable 2-hydroxybenzophenones are for example 4-hydroxy-, 4-methoxy-, 4-octyloxy-, 4-decyloxy-4-dodecyloxy, 4-benzyloxy, 4,2',4'-trihydroxy and 2'-hydroxy-4,4'-dimethyoxy derivatives of 2-hydroxybenzophenones.

Suitable acrylates are for example ethyl-α-cyano-β,β-diphenylacrylate, isooctyl-α-cyano-β,β-diphenylacrylate, methyl-α-carbomethoxycinnamate, methyl-α-cyano-β-methyl-p-methoxycinnamate, butyl-α-cyano-β-methyl-p-methoxycinnamate, methyl-a-carbomethoxy-p-methoxycinnamate and N-(β-carbomethoxy-β-cyanovinyl)-2-methylindoline.

Suitable esters of benzoic acids are for example 4-tert-butylphenylsalicylate, phenylsalicylate, octylphenylsalicylate, dibenzoylresorcinol, bis(4-tert-butylbenzoyl) resorcinol, benzoylresorcinol, 2,4-di-tert-butylphenyl-3,5-di-tert-butyl-4-hydroxybenzoate, hexadecyl-3,5-di-tert-butyl-4-hydroxybenzoate, octadecyl-3,5-di-tert-butyl-4-hydroxybenzoate, 2-methyl-4,6-di-tert-butylphenyl-3,5-di-tert-butyl-4-hydroxybenzoate.

Suitable oxamides are for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and mixtures thereof with 2-ethoxy-2'-ethyl-5,4'-di-tert-butoxanilide, mixtures of o- and p-methoxy-disubstituted oxanilides and mixtures of o- and p-ethoxy-disubstituted oxanilides.

Suitable 2-(2-hydroxyphenyl)-1,3,5-triazines are for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)-phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl-1,3,5-triazine.

Suitable metal deactivators are for example N,N'-diphenyloxamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyldihydrazide, oxanilide, isophthaloyldihydrazide, sebacoylbisphenylhydrazide, N,N'-diacetyladipoyldihydrazide, N,N'-bis(salicyloyl)oxylyldihydrazide, N,N'-bis(salicyloyl)thiopropionyldihydrazide.

In particular, the following structures are suitable as metal deactivators:

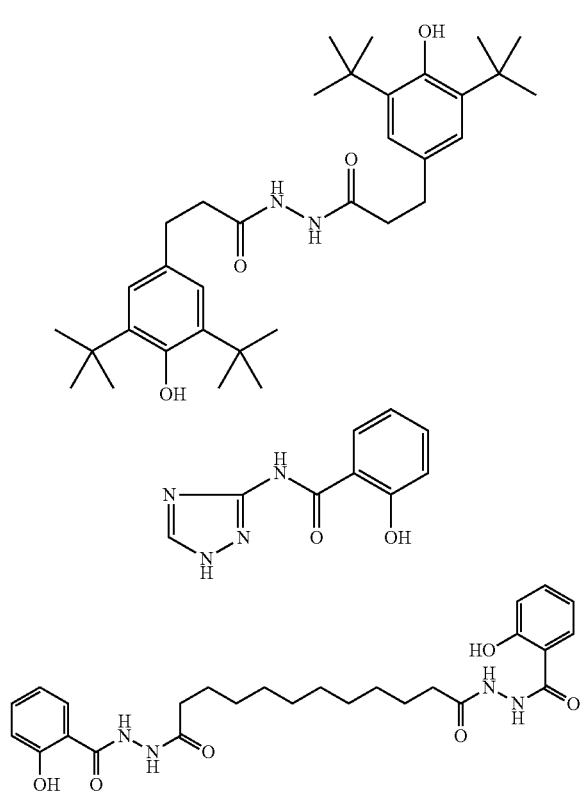

Suitable stabilisers are for example phenolic antioxidants. Suitable phenolic antioxidants are for example:

alkylated monophenols, such as e.g. 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or branched nonylphenols, such as e.g. 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures hereof;

alkylthiomethylphenols, such as e.g. 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;

hydroquinones and alkylated hydroquinones, such as e.g. 2,6-di-tert-butyl-4-methyoxyphenol, 2, 5-di-tert-butylhydroquinone, 2, 5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3, 5-di-tert-butyl-4-hydroxyphenylstearate, bis(3,5-di-tert-butyl-4-hydroxylphenyl)adipate;

tocopherols, such as e.g. α-, β-, γ-, δ-tocopherol and mixtures of these (vitamin E);

hydroxylated thiodiphenylethers, such as e.g. 2,2'-thiobis (6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amyl-phenol), 4,4'-bis(2,6-dimethyl-4-hydroxyphenyl)disulphide;

alkylidene bisphenols, such as e.g. 2,2'methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol, 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethyleneglycolbis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane;

O-, N- and S-benzyl compounds, such as e.g. 3,5,3',5'-tetra-tert-butyl-4,4'-dihydroxydibenzylether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl) sulphide, isooctyl-3,5-di-tert-butyl-4-hydroxybenzylmercaptoacetate;

hydroxybenzylated malonates, such as e.g. dioctadecyl-2,2-bis(3,5-di-tert-butyl-2-hydroxybenzyl)malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate;

aromatic hydroxybenzyl compounds, such as e.g. 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol;

triazine compounds, such as e.g. 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxphenylethyl)-1,3,5-triazine, 1,3,5-tris (3,5-di-tert-butyl-4-hydroxyphenylpropionyl)hexahydro-1, 3,5-triazine, 1,3,5-tris(3,5-dicyclohexyl-4-hydroxybenzyl) isocyanurate;

benzylphosphonates, such as e.g. dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethylester of 3,5-di-tert-butyl-4-hydroxybenzylphosphonic acid;

acylaminophenols, such as e.g. 4-hydroxylauranilide, 4-hydroxystearanilide, octyl-N-(3,5-di-tert-butyl-4-hydroxyphenyl)carbamate;

esters of β-(3,5-di-tert-butyl-4-hydroxyphenyl)propionic acid with mono- or multivalent alcohols, e.g. methanol, ethanol, n-octanol, i-octanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of β-(5-tert-butyl-4-hydroxy-3-methylphenyl)propionic acid with mono- or multivalent alcohols, e.g. methanol, ethanol, n-octanol, i-octanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, 3,9-bis[2-{3-(3-tert-butyl-4-hydroxy-5-methylphenyl) propionyloxy}-1,1-dimethylethyl]-2,4,8,10-tetraoxaspiro[5.5]undecane;

esters of β-(3,5-dicyclohexyl-4-hydroxyphenyl)propionic acid with mono- or multivalent alcohols, e.g. methanol, ethanol, octanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of 3,5-di-tert-butyl-4-hydroxyphenyl)acetic acid with mono- or multivalent alcohols, e.g. methanol, ethanol, octanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

amides of β-(3,5-di-tert-butyl-4-hydroxyphenyl)propionic acid, such as e.g. N,N'-bis(3,5-di-tert-butyl-4-hydroxyphenylpropionyl)hexamethylene diamide, N,N'-bis(3,5-di-tert-butyl-4-hydroxyphenylpropionyl)hexamethylene diamide, N,N'-bis(3,5-di-tert-butyl-4-hydroxyphenylpropionyl)hexamethylene diamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, marketed by Uniroyal);

ascorbic acid (vitamin C).

Particularly preferred phenolic antioxidants are:
octadecyl-3-(3,5-di-tert-butyl-4-hydroxyphenyl)propionate, pentaerythritoltetrakis[3-(3, 5-di-tert-butyl-4-hydroxyphenyl) propionate, tris(3,5-di-tert-butyl-4-hydroxyphenyl)isocyanurate, 1,3,5-trimethyl-2,4,6-tris(3,5-di-tert-butyl-4-hydroxyphenyl)isocyanurate, 1,3,5-trimethyl-2,4,6-tris(3,5-di-tert-butyl-4-hydroxybenzyl)benzene, triethyleneglycol-bis[3-(3-tert-butyl-4-hydroxy-5-methylphenyl) propionate, N, N'-hexane-1,6-diyl-bis[3-(3,5-di-tert-butyl-4-hydroxyphenyl)propionic acid amide.

Further suitable stabilisers are phosphites/phosphonites. Suitable phosphites/phosphonites are for example:

triphenylphosphite, diphenylalkylphosphites, phenyldialkylphosphites, tri(nonylphenyl)phosphite, trilaurylphosphites, trioctadecylphosphite, distearylpentaerythritol diphosphite, tris-(2,4-di-tert-butylphenyl)phosphite, diisodecylpentaerythritol diphosphite, bis(2,4-di-tert-butylphenyl)pentaerythritol diphosphite, bis(2,4-di-cumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl)methylphosphite, bis(2,4-di-tert-butyl-6-methylphenyl)ethylphosphite, 6-fluoro-2,4,8,10-tetra-tert-butyl-12-methyldibenzo[d,g]-1,3,2-dioxaphosphocine, 2,2'2"-nitrilo[triethyltris(3,3",5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl))phosphite, 5-butyl-5-ethyl-2-(2,4,6-tri-tert-butylphenoxy)-1,3,2-dioxaphosphirane.

Particularly preferred phosphites/phosphonites are:

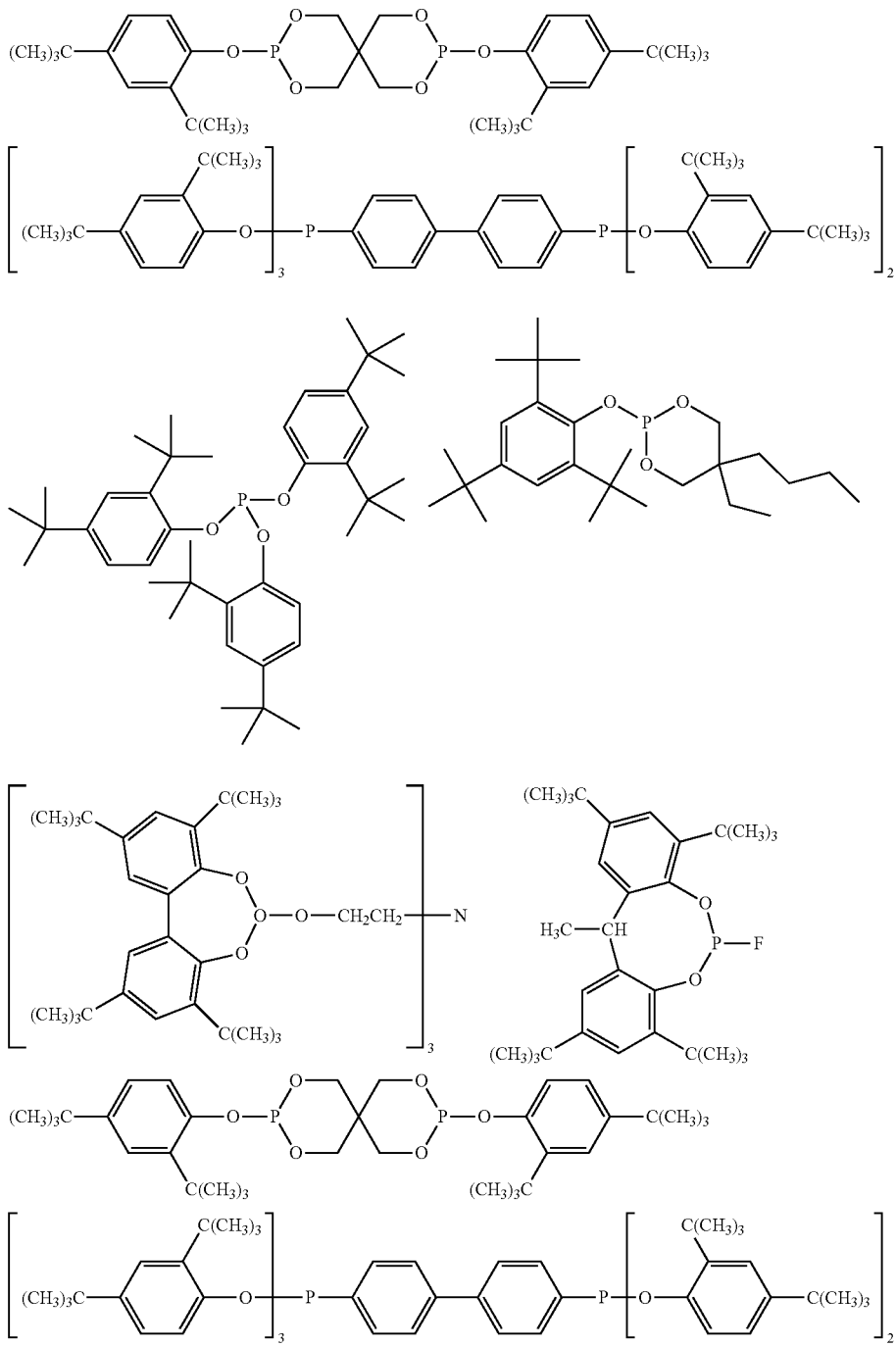

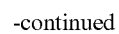

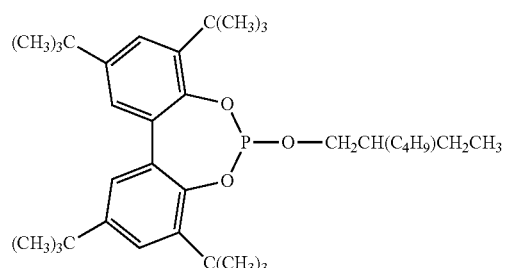
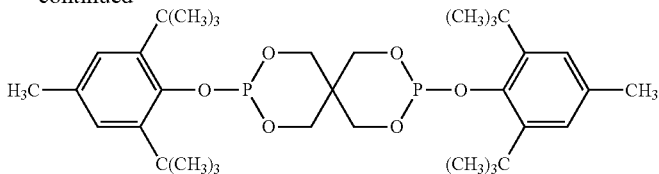
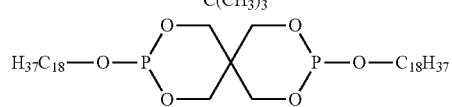
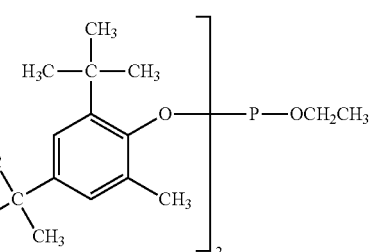
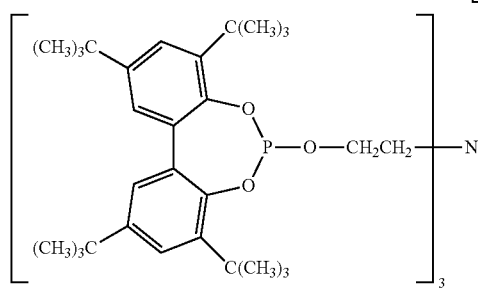
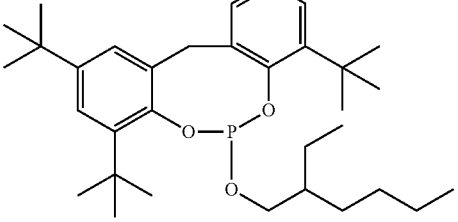
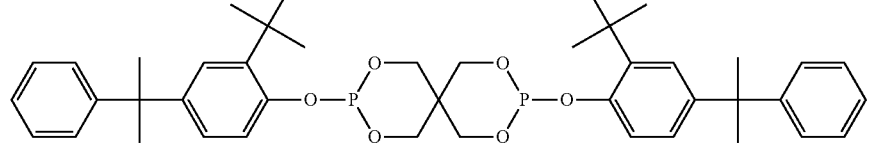
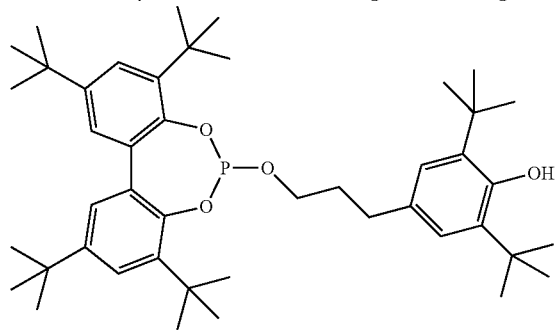

Further suitable stabilisers are aminic antioxidants. Suitable aminic antioxidants are for example:

N,N'-diisopropyl-p-phenylene diamine, N,N'-di-sec-butyl-p-phenylene diamine, N,N'-bis(1,4-dimethylpentyl)-p-phenylene diamine, N,N'-bis(1-ethyl-3-methylpentyl)-p-phenylene diamine, N,N'-bis(1-methylheptyl)-p-phenylene diamine, N,N'-dicyclohexyl-p-phenylene diamine, N,N'-diphenyl-p-phenylene diamine, N,N'-bis(2-naphthyl)-p-phenylene diamine, N-isopropyl-N'-phenyl-p-phenylene diamine, N-(1,3-dimethylbutyl)-N'-phenyl-p-phenylene diamine, N-(1-methylheptyl)-N'-phenyl-p-phenylene diamine, N-cyclohexyl-N'-phenyl-p-phenylene diamine, 4-(p-toluenesuphamoyl)diphenylamine, N,N'-dimethyl-N,N'-di-sec-butyl-p-phenylene diamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'- diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene and also mixtures or combinations hereof.

Further suitable aminic antioxidants are hydroxylamines or N-oxides (nitrons), such as e.g. N,N-dialkylhydroxylamines, N,N-dibenzylhydroxylamine, N,N-dilaurylhydroxylamine, N,N-distearylhydroxylamine, N-benzyl-α-phenylnitron, N-octadecyl-α-hexadecylnitron, and also Genox EP (Chemtura) according to the formula:

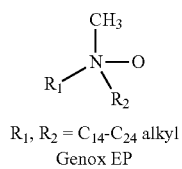

$R_1, R_2 = C_{14}\text{-}C_{24}$ alkyl
Genox EP

Further suitable stabilisers are thiosynergists. Suitable thiosynergists are for example distearylthiodipropionate, dilauryldipropionate or the compound according to the following formula:

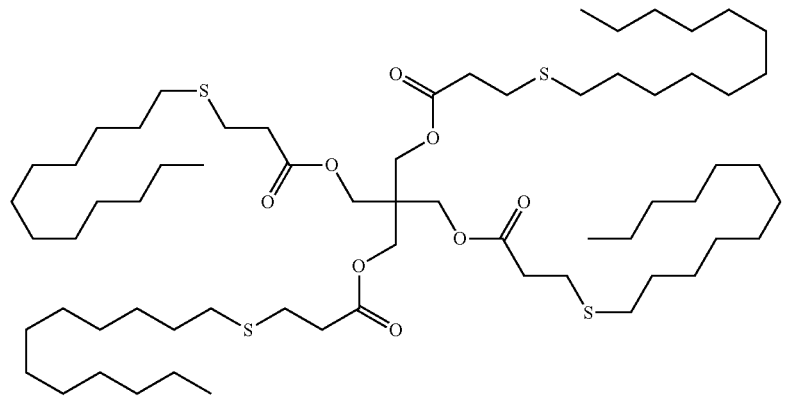 [SMILES: CCCCCCCCCCCCSCCC(=O)OCC(COC(=O)CCSCCCCCCCCCCCC)(COC(=O)CCSCCCCCCCCCCCC)COC(=O)CCSCCCCCCCCCCCC]

Further suitable stabilisers, in particular for polyamides, are copper salts such as e.g. copper-(I)-iodide, copper-(I)-bromide or copper complexes such as e.g. triphenylphosphine-copper-(I)-complexes.

Further suitable stabilisers are hindered amines. Suitable hindered amines are for example 1,1-bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylene diamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylene diamine and 4-morpholino-2,6-dichloro-1,3,5-triazine, the reaction product of 7,7,9,9-tetramethyl-2-cycloundecyl-1-oxa-3,8-diaza-4-oxospiro-[4,5]decane and epichlorohydrin.

Suitable dispersants are for example:

polyacrylates, e.g. copolymers with long-chain side groups, polyacrylate-block copolymers, alkylamides: e.g. N,N'-1,2-ethanediylbisoctadecanamide sorbitan ester, e.g. monostearylsorbitane ester, titanates and zirconates, reactive copolymers with functional groups e.g. polypropylene-co-acrylic acid, polypropylene-co-maleic anhydride, polyethylene-co-glycidylmethacrylate, polystyrene-alt-maleic anhydride-polysiloxanes: e.g. dimethylsilanediolethylene oxide copolymer, polyphenylsiloxane copolymer, amphiphilic copolymers: e.g. polyethylene-block-polyethylene oxide, dendrimers, e.g. hydroxyl group-containing dendrimers.

Suitable nucleation agents are for example talc, alkali or alkaline earth salts of mono- and polyfunctional carboxylic acids, such as e.g. benzoic acid, succinic acid, adipic acid, e.g. sodium benzoate, zinc glycerolate, aluminium hydroxybis(4-tert-butyl)benzoate, benzylidene sorbitols, such as e.g. 1,3:2,4-bis(benzylidene)sorbitol oder 1,3:2,4-bis(4-methylbenzylidene)sorbitol, 2,2'-methylene-bis-(4,6-di-tert-butylphenyl)phosphate, and also trisamides, such as e.g. according to the following structures

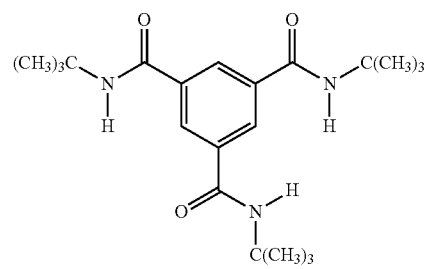

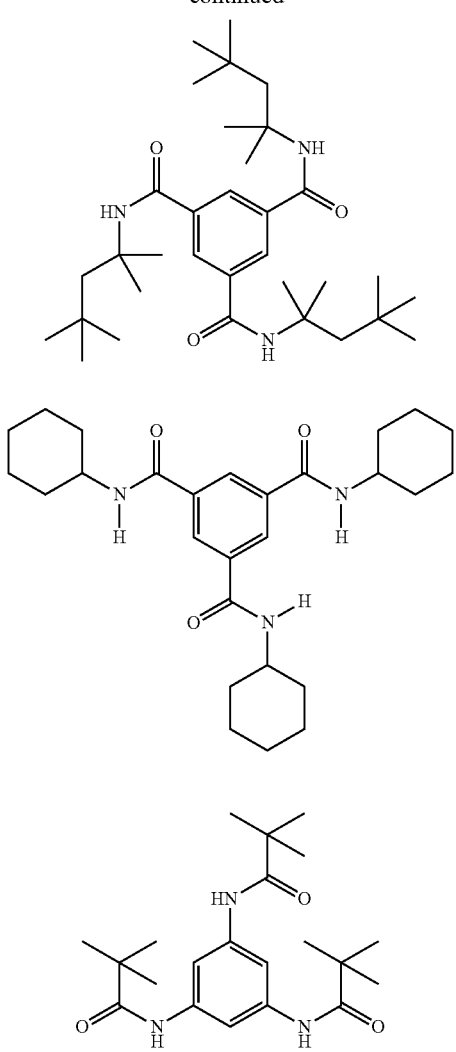

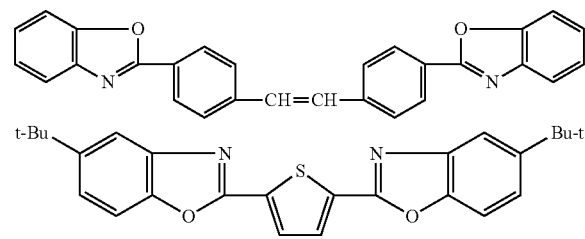

Suitable filler deactivators are for example epoxides, such as e.g. bis-phenol-A-diglycidylethers, polysiloxanes, polyacrylates, in particular block copolymers such as polymethacrylic acid-polyalkylene oxide.

Suitable antistatic agents are for example ethoxylated alkylamines, fatty acid esters, akylsulphonates and polymers such as e.g. polyether amides.

A further preferred embodiment of the plastic material moulding compound according to the invention provides that the plastic material moulding compound, in addition to the at least one copolymer or polymer and the at least one plastic material, comprises in addition 0.01 to 10 parts by weight, preferably 0.05 to 3 parts by weight, relative to the totality of the at least one copolymer or polymer and of the at least one plastic material, at least one stabiliser, selected from the group consisting of phenolic antioxidants, phosphites/phosphonites, aminic antioxidants, sulphur-containing antioxidants or hydroxylamines.

The stabiliser is thereby selected preferably from the group consisting of a) phenolic antioxidants, in particular octadecyl-3-(3,5-di-tert-butyl-4-hydroxyphenyl)propionate, pentaerythritol-tetrakis[3-(3, 5-di-tert-butyl-4-hydroxyphenyl) propionate, tris(3,5-di-tert-butyl-4-hydroxyphenyl)isocyanurate, 1,3,5-trimethyl-2,4,6-tris(3,5-di-tert-butyl-4-hydroxyphenyl)isocyanurate, 1,3,5-trimethyl-2,4,6-tris(3,5-di-tert-butyl-4-hydroxybenzyl)benzene, triethylene glycol-bis[3-(3-tert-butyl-4-hydroxy-5-methylphenyl) propionate, N,N'-hexane-1,6-diyl-bis[3-(3,5-di-tert-butyl-4-hydroxyphenyl)propionic acid amide, b) phosphites/phosphonites, in particular tris-(2,4-di-tert-butylphenyl)phosphite, diisodecylpentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tetrakis(2,4-di-tert-butylphenyl)-4,4'biphenylene diphosphonite, Suitable fillers and reinforcing materials are for example synthetic or natural materials, such as e.g. calcium carbonate, silicates, glass fibres, glass balls (solid or hollow), talc, mica, kaolin, barium sulphate, metal oxides and metal hydroxides, carbon black, graphite, carbon nanotubes, graphene, sawdust or fibres of natural products, such as e.g. cellulose or synthetic fibres. Further suitable fillers are hydrotalcites or zeolites or layer silicates, such as e.g. montmorillonite, bentonite, beidellite, mica, hectorite, saponite, vermiculite, ledikite, magadiite, illite, kaolinite, wollastonite, attapulgite.

Suitable pigments can be of an inorganic or organic nature. Inorganic pigments are for example titanium dioxide, zinc oxide, zinc sulphide, iron oxide, ultramarine, carbon black, organic pigments are for example anthraquinones, anthanthrones, benzimidazolones, quinacridones, diketopyrrolopyrroles, dioxazines, indanthrones, isoindolinones, azo compounds, perylenes, phthalocyanines or pyranthrones. Further suitable pigments are effect pigments based on metal or pearlescent pigments based on metal oxide.

Optical brighteners are for example bisbenzoxazoles, phenylcoumarines or bis(styryl)biphenyls and in particular optical brighteners of the formulae:

c) aminic antioxidants, in particular N,N'-diisopropyl-p-phenylene diamine, N,N'-di-sec-butyl-p-phenylene diamine, N,N'-bis(1,4-dimethylpentyl)-p-phenylene diamine, N,N'-bis(1-ethyl-3-methylpentyl)-p-phenylene diamine, N,N'-bis(1-methylheptyl)-p-phenylene diamine, N,N'-dicyclohexyl-p-phenylene diamine, N,N'-diphenyl-p-phenylene diamine, N,N'-bis(2-naphthyl)-p-phenylene diamine, N-isopropyl-N'-phenyl-p-phenylene diamine, N-(1,3-dimethylbutyl)-M-phenyl-p-phenylene diamine, N(1-methylheptyl)-N'-phenyl-p-phenylene diamine, N-cyclohexyl-N'-phenyl-p-phenylene diamine, d) sulphur-comprising antioxidants, in particular distearyl-thiodipropionate, dilauryldipropionate, e) hydroxylamines, in particular N,N-dialkylhydroxylamines, N,N-dibenzylhydroxylamine, N,N-dilaurylhydroxylamine, N,N-distearylhydroxylamine, N-benzyl-α-phenylnitron, N-octadecyl-α-hexadecylnitron, f) hindered amines, in particular 1,1-bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis-(1,2,2,6,6-pentamethyl-4-piperidyl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylene diamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylene diamine and 4-morpholino-2,6-dichloro-1,3,5-triazine, the reaction product of 7,7,9,9-tetramethyl-2-cycloundecyl-1-oxa-3,8-diaza-4-oxospiro-[4,5]decane and epichlorohydrin.

In a further preferred variant of the plastic material moulding compound according to the invention, the at least one plastic material is selected from the group consisting of a) polymers made of olefins or diolefins such as e.g. polyethylene (LDPE, LLDPE, VLDPE, MDPE, HDPE), polypropylene, polyisobutylene, poly-4-methyl-pentene-1, polybutadiene, polyisoprene, polycyclooctene, and also copolymers in the form of statistical or block structures such as e.g. polypropylene-polyethylene (EP), EPM or EPDM, ethylene-vinylacetate (EVA), ethylene-acrylic ester, b) polystyrene, polymethylstyrene, styrene-butadiene, styrene-butadiene-styrene (SBS), styrene-isoprene, styrene-butadiene-acrylonitrile (ABS), styrene-acrylonitrile-acrylate (ASA), styrene-maleic anhydride polymers including corresponding graft copolymers, such as e.g. styrene on butadiene or maleic anhydride on SBS, c) halogen-comprising polymers, such as e.g. polyvinylchloride and polyvinylidene chloride, d) polymers of unsaturated esters such as e.g. polyacrylates and polymethacrylates such as PMMA, polyacrylonitrile, e) polymers of unsaturated alcohols and derivatives, such as e.g. polyvinyl alcohol, polyvinylacetate, polyvinylbutyral, f) polyacetals, such as e.g. polyoxymethylene, g) polyphenylene oxides and blends with polystyrene, h) polyurethanes, in particular linear polyurethanes, i) polyamides, such as e.g. polyamide-6, 6.6, 6.10. 4.6, 4.10, 6.12, 12.12, polyamide 11, polyamide 12 and also (partially) aromatic polyamides such as e.g. polyphthalamides, j) polyimides, polyamideimides, polyetherimides, polyketones, polysulphones, polyethersulphones, polyphenylenesulphide, k) polyesters, such as e.g. polyethylene terephthalate and polybutylene terephthalate, polylactic acid, l) polycarbonate, m) cellulose derivatives, such as e.g. cellulose nitrate, cellulose acetate, cellulose propionate, n) and also mixtures, combinations or blends of two or more of the previously mentioned polymers.

Furthermore, it is preferred that the plastic material moulding compound is present in the form of injection moulded parts, foils or films, coatings or paints, foams, fibres, cables, cable channels and pipes, profiles, hollow bodies, strips, membranes, such as e.g. geomembranes, or adhesives, which are produced via extrusion, injection moulding, blow-moulding, calendering, compression methods, spinning processes, rotomoulding or brushing- and coating processes, e.g. for the electrical and electronics industry, construction industry, transport industry (car, train, aircraft, ship), for medical applications, for household- and electrical appliances, vehicle parts, consumer articles, packaging, furniture, textiles. A further field of use is for varnishes, paints and coatings.

The present invention is explained in more detail with reference to the following examples without restricting the invention to the specially represented parameters.

PRODUCTION OF POLYMERS ACCORDING TO THE INVENTION

Example 1

Synthesis of Ethylene-N-Hydroxy Maleimide Methylether Copolymer (EMA1) with Alternating Monomer Units

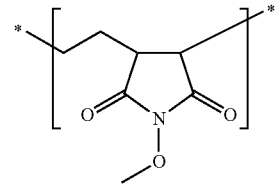

In a Schlenk flask with magnetic stirring rods 10 g polyethylene-alt-maleic anhydride (ZeMac® E60P available from Vertellus) and 7.3 g O-methylhydroxylamine hydrochloride (available from TCI Deutschland GmbH) is dissolved in 150 ml dry dimethylformamide under a nitrogen atmosphere. The solution is subsequently heated for two hours at 90° C. with agitation. The resulting polymer is precipitated in methanol and purified thereupon by repeated solution in acetonitrile and precipitation in methanol.

$^1$H-NMR (300 MHz, DMSO) δ=3.80 (s, —CH$_3$), 3.32 (s, erythro —CH—), 2.60 (s, —CH—), 1.91-1.70 (m, —CH$_2$—) ppm.

$^{13}$C-NMR (76 MHz, DMSO) δ=172.92 (—C=O), 64.15 (CH$_3$), 42.02 (—CH—), 27.13 (—CH$_2$—) ppm.

Example 2

Synthesis of Ethylene-N-Hydroxy Maleimide Benzylether Copolymer (EMA2) with Alternating Monomer Units

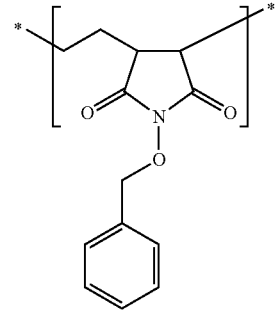

Analogously to the synthesis described in example 1, 10 g polyethylene-alt-maleic anhydride and 13.9 g O-benzyl-hydroxylamine hydrochloride (available from TCI Deutschland GmbH) is dissolved in 150 ml dry dimethylformamide under a nitrogen atmosphere. The solution is subsequently heated for two hours at 90° C. with agitation. The resulting polymer is precipitated in methanol and purified thereupon by repeated solution in tetrahydrofuran and precipitation in methanol.

$^1$H-NMR (300 MHz, DMSO) δ=7.43 (s, ortho Ph-H), 7.36 (s, meta/para PhH), 5.03 (s, Ph-CH$_2$—), 3.58 (s, —CH—), 3.34 (s, —CH—), 1.91-1.70 (m, —CH$_2$—) ppm.

$^{13}$C-NMR (76 MHz, DMSO) δ=173.08 (—C=O), 133.81 (tert-C), 129.66 (ortho-C), 129.06 (meta-C), 128.37 (para-C), 77.82 (Ph-CH$_2$—), 41.84 (—CH—), 26.76 (—CH$_2$—) ppm.

Production and Testing of a Flame-Retardant Plastic Material Mixture According to the Invention The extrusions of the polypropylene samples (DOW C766-03) are effected at a temperature of 190° C. and a screw speed of rotation of 150 rpm on an 11 mm twin-screw extruder (process 11 of Thermo Scientific).

The desired ratio of polymer and additives is firstly homogenised by mixing and supplied via a volumetric metering to the extrusion.

Test pieces for the fire test are produced from the granulate at a temperature of 220° C. and a pressure of 2 t using a hydraulic 10 t press (Werner 86 Pfleiderer). For this purpose, the granulate is filled into the compression mould and this is transferred into the already preheated press. At a pressure of 0.5 t, the granulate is melted firstly for 60 s. After conclusion of the melting time, the pressure is increased to 2 t and kept constant for a further 3 min. Whilst maintaining the compression pressure, the mould is cooled to 60° C. and thereafter the test pieces are removed. The test pieces have the following dimensions according to the standard: 127.5× 12.5×1.5 mm.

Table 1 indicates compositions in polypropylene and results of the fire test. The examples according to the invention and comparative examples contained in table 1 were tested according to DIN EN 60695-11-10 and the burning times and classification were carried out according to the standard.

The product Exolit OP 1230 of Clariant SE was used as diethylaluminium phosphinate.

The examples according to the invention have surprisingly reduced burning times relative to the comparative examples and the classification according to V-2 is awarded.

The invention claimed is:

1. A method for producing a copolymer or polymer comprising at least one of the following structural elements:

a)

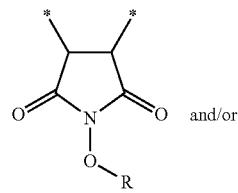

and/or

Formula Ia

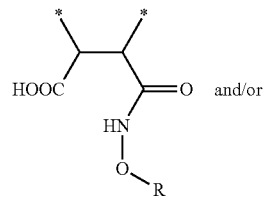

and/or

Formula Ib b)

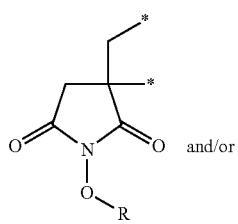

and/or

Formula IIa

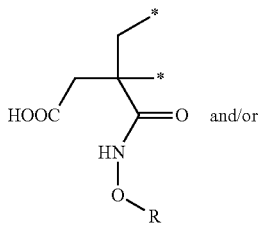

and/or

Formula IIB

TABLE 1

| Example | Composition Flame retardant | Burning times sum of the subsequent burning times of 5 test pieces with 2 burnings | Classification according to DIN EN 60695-11-10 |
| --- | --- | --- | --- |
| comparative example 1 (state of the art) | 15% diethylaluminium phosphinate | >200 seconds | not classified |
| comparative example 2 | 20% diethylaluminium phosphinate | 170 seconds | not classified |
| example 3 according to the invention | 15% diethylaluminium phosphinate + 2% EMA 1 | 21.7 seconds | V-2 |
| example 4 according to the invention | 15% diethylaluminium phosphinate + 2% EMA 2 | 71.8 seconds | V-2 | the method comprising:

reacting a copolymer or polymer comprising a maleic anhydride unit or an itaconic anhydride unit with an amine according to the general formula IV:

$$H_2N-O-R \qquad (IV),$$

wherein, respectively independently of each other,

R is an optionally substituted alkyl radical with 1 to 18 carbon atoms, an optionally substituted cycloalkyl radical with 6 to 22 carbon atoms, an optionally substituted aryl radical with 6 to 36 carbon atoms, or an optionally substituted acyl radical with 2 to 18 carbon atoms or hydrogen,

* is a binding site in the copolymer or polymer, n is 0 or 1, and

X is methyl.

2. The method of claim 1, which comprises reacting a copolymer or polymer comprising a maleic anhydride unit with an amine according to the general formula IV.

3. The method of claim 1, which comprises reacting a copolymer or polymer comprising an itaconic anhydride unit with an amine according to the general formula IV.

4. The method of claim 1, wherein R is an optionally substituted alkyl radical with 1 to 18 carbon atoms.

5. The method of claim 1, wherein R is an optionally substituted cycloalkyl radical with 6 to 22 carbon atoms.

6. The method of claim 1, wherein R is an optionally substituted aryl radical with 6 to 36 carbon atoms.

7. The method of claim 1, wherein R is an optionally substituted acyl radical with 2 to 18 carbon atoms or hydrogen.

8. The method of claim 1, wherein n is 0.

9. The method of claim 1, wherein n is 1.

10. The method of claim 2, wherein R is an optionally substituted alkyl radical with 1 to 18 carbon atoms.

11. The method of claim 2, wherein R is an optionally substituted cycloalkyl radical with 6 to 22 carbon atoms.

12. The method of claim 2, wherein R is an optionally substituted aryl radical with 6 to 36 carbon atoms.

13. The method of claim 2, wherein R is an optionally substituted acyl radical with 2 to 18 carbon atoms or hydrogen.

14. The method of claim 2, wherein n is 0.

15. The method of claim 2, wherein n is 1.

16. The method of claim 3, wherein R is an optionally substituted alkyl radical with 1 to 18 carbon atoms.

17. The method of claim 3, wherein R is an optionally substituted cycloalkyl radical with 6 to 22 carbon atoms.

18. The method of claim 3, wherein R is an optionally substituted aryl radical with 6 to 36 carbon atoms.

19. The method of claim 3, wherein R is an optionally substituted acyl radical with 2 to 18 carbon atoms or hydrogen.

20. The method of claim 3, wherein n is 0.

* * * * *